(12) United States Patent
Fukumine

(10) Patent No.: US 10,239,979 B2
(45) Date of Patent: Mar. 26, 2019

(54) HIGHLY SATURATED NITRILE RUBBER COMPOSITION AND CROSS-LINKED RUBBER

(71) Applicant: ZEON CORPORATION, Tokyo (JP)

(72) Inventor: Yoshio Fukumine, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 28 days.

(21) Appl. No.: 15/508,822

(22) PCT Filed: Sep. 4, 2015

(86) PCT No.: PCT/JP2015/075250
§ 371 (c)(1),
(2) Date: Mar. 3, 2017

(87) PCT Pub. No.: WO2016/035892
PCT Pub. Date: Mar. 10, 2016

(65) Prior Publication Data
US 2017/0253684 A1    Sep. 7, 2017

(30) Foreign Application Priority Data

Sep. 5, 2014    (JP) .................... 2014-180787

(51) Int. Cl.
| | | |
|---|---|---|
| *C08F 236/12* | (2006.01) | |
| *C08L 13/00* | (2006.01) | |
| *C08L 33/18* | (2006.01) | |
| *C08L 67/00* | (2006.01) | |
| *C08K 5/14* | (2006.01) | |
| *C08L 67/02* | (2006.01) | |

(52) U.S. Cl.
CPC ............. *C08F 236/12* (2013.01); *C08K 5/14* (2013.01); *C08L 13/00* (2013.01); *C08L 33/18* (2013.01); *C08L 67/00* (2013.01); *C08L 67/02* (2013.01)

(58) Field of Classification Search
CPC ........... C08F 236/12; C08K 5/14; C08L 67/02
See application file for complete search history.

(56) References Cited

U.S. PATENT DOCUMENTS

| | | | | |
|---|---|---|---|---|
| 5,397,839 A | * | 3/1995 | Patel | C08L 15/005 524/513 |
| 6,489,385 B1 | * | 12/2002 | Fujii | C08K 5/005 524/186 |
| 6,657,014 B1 | * | 12/2003 | Mori | C08K 5/17 525/194 |
| 2003/0134979 A1 | | 7/2003 | Ferrari et al. | |
| 2009/0099317 A1 | | 4/2009 | Achten et al. | |

FOREIGN PATENT DOCUMENTS

| | | | |
|---|---|---|---|
| CN | 101374890 A | | 2/2009 |
| JP | 2002080639 A | * | 3/2002 |
| JP | 2014-118549 A | | 6/2014 |
| WO | 2003/020820 A1 | | 3/2003 |

OTHER PUBLICATIONS

March 14, 2018 Extended European Search Report issued in Patent Application No. 15838570.8.
Nov. 17, 2015 International Search Report issued in International Patent Application No. PCT/JP2015/075250.

* cited by examiner

*Primary Examiner* — Robert S Jones
(74) *Attorney, Agent, or Firm* — Oliff PLC

(57) ABSTRACT

A highly saturated nitrile rubber composition obtained by mixing 7 to 40 wt % of a carboxyl group-containing highly saturated nitrile rubber (A1) containing 15 to 60 wt % of α,β-ethylenically unsaturated nitrile monomer units and 1 to 60 wt % of α,β-ethylenically unsaturated dicarboxylic acid monoester monomer units and having an iodine value of 120 or less, 10 to 78 wt % of a highly saturated nitrile rubber (A2) containing α,β-ethylenically unsaturated nitrile monomer units in 15 to 60 wt %, having a content of α,β-ethylenically unsaturated dicarboxylic acid monoester monomer units of 0.9 wt % or less, and having an iodine value of 120 or less, and 15 to 50 wt % of a polyester resin (B) at a temperature of a melting point of the polyester resin (B) or more is provided.

8 Claims, No Drawings

HIGHLY SATURATED NITRILE RUBBER COMPOSITION AND CROSS-LINKED RUBBER

TECHNICAL FIELD

The present invention relates to a highly saturated nitrile rubber composition able to give a cross-linked rubber which is excellent in heat resistance and fuel oil resistance and is highly balanced in tensile strength, elongation, and compressive stress and to a cross-linked rubber obtained using that rubber composition.

BACKGROUND ART

Since the past, nitrile rubber (acrylonitrile-butadiene copolymer rubber) has been used as a material for rubber parts such as hoses and tubes for automobiles by taking advantage of its fuel oil resistance, mechanical properties, chemical resistance, etc. Further, hydrogenated nitrile rubber (highly saturated nitrile rubber) obtained by saturation by hydrogenating the carbon-carbon double bonds in the polymer main chain is further excellent in heat resistance, so is being used for rubber parts such as hoses, seal members, gaskets, and diaphragms.

In recent years, the properties demanded for rubber parts for automobiles have become increasingly tough. In particular, rubber parts used for seal member applications, in particular rubber parts used for high pressure seal member applications, have been required to be excellent in compressive stress from the viewpoint of keeping defamation low even under high pressure conditions in addition to excellent heat resistance and fuel oil resistance.

For example, Patent Document 1 discloses a rubber composition obtained by blending a polyamide with a hydrogenated carboxylated nitrile rubber at a temperature over 20° C. According to the art of this Patent Document 1, a cross-linked rubber excellent in heat resistance and fuel oil resistance is obtained, but the compressive stress is not sufficient, therefore this has not been suited for seal member applications, in particular application to high pressure seal members used in high pressure environments.

RELATED ART

Patent Documents

Patent Document 1: International Publication No. WO2003/020820A

SUMMARY OF THE INVENTION

Problem to be Solved by the Invention

The present invention was made in consideration of such an actual situation and has as its object the provision of a highly saturated nitrile rubber composition able to give a cross-linked rubber which is excellent in heat resistance and fuel oil resistance and is highly balanced in tensile strength, elongation, and compressive stress and of a cross-linked rubber obtained using that rubber composition.

Means for Solving the Problem

The present inventors engaged in intensive research to achieve the above object and as a result discovered that the above object can be achieved by a highly saturated nitrile rubber composition obtained by using, as a highly saturated nitrile rubber, together in a specific ratio a carboxyl group-containing highly saturated nitrile rubber (A1) containing 1 to 60 wt % of α,β-ethylenically unsaturated dicarboxylic acid monoester monomer units and a highly saturated nitrile rubber (A2) having a content of α,β-ethylenically unsaturated dicarboxylic acid monoester monomer units of 0.9 wt % or less, adding into this a specific amount of a polyester resin (B), and mixing these at a temperature higher than the melting point of the polyester resin (B) and thereby completed the present invention.

That is, according to the present invention, there is provided a cross-linkable nitrile rubber composition comprising a carboxyl group-containing highly saturated nitrile rubber (A1) containing 15 to 60 wt % of α,β-ethylenicallyunsaturatednitrile monomer units and 1 to 60 wt % of α,β-ethylenically unsaturated dicarboxylic acid monoester monomer units and having an iodine value of 120 or less, a highly saturated nitrile rubber (A2) containing α,β-ethylenically unsaturated nitrile monomer units in 15 to 60 wt %, having a content of α,β-ethylenically unsaturated dicarboxylic acid monoester monomer units of 0.9 wt % or less, and having an iodine value of 120 or less, and a polyester resin (B), wherein the highly saturated nitrile rubber composition contains 7 to 40 wt % of the carboxyl group-containing highly saturated nitrile rubber (A1), 10 to 78 wt % of the highly saturated nitrile rubber (A2), and 15 to 50 wt % of the polyester resin (B) when a total of the carboxyl group-containing highly saturated nitrile rubber (A1), the highly saturated nitrile rubber (A2), and the polyester resin (B) is made 100 wt %, and the highly saturated nitrile rubber composition is obtained by mixing the carboxyl group-containing highly saturated nitrile rubber (A1), the highly saturated nitrile rubber (A2), and the polyester resin (B) at a temperature of a melting point of the polyester resin (B) or more.

In the highly saturated nitrile rubber composition of the present invention, preferably the polyester resin (B) is polyethylene terephthalate, polybutylene terephthalate, and/or polyethylene naphthalate.

Further, according to the present invention, there is provided a cross-linkable nitrile rubber composition obtained by blending a cross-linking agent (C) into the above highly saturated nitrile rubber composition.

Furthermore, according to the present invention, there is provided a cross-linked rubber obtained by cross-linking the above cross-linkable nitrile rubber composition.

Alternatively, according to the present invention, there is provided a cross-linked rubber obtained by cross-linking a cross-linkable nitrile rubber composition, the cross-linkable nitrile rubber composition containing:

a carboxyl group-containing highly saturated nitrile rubber (A1) containing 15 to 60 wt % of α,β-ethylenically unsaturated nitrile monomer units and 1 to 60 wt % of α,β-ethylenically unsaturated dicarboxylic acid monoester monomer units and having an iodine value of 120 or less;

a highly saturated nitrile rubber (A2) containing α,β-ethylenically unsaturated nitrile monomer units in 15 to 60 wt %, having a content of α,β-ethylenically unsaturated dicarboxylic acid monoester monomer units of 0.9 wt % or less, and having an iodine value of 120 or less;

a polyester resin (B); and a cross-linking agent (C), wherein the cross-linked rubber contains 7 to 40 wt % of the carboxyl group-containing highly saturated nitrile rubber (A1), 10 to 78 wt % of the highly saturated nitrile rubber (A2), and 15 to 50 wt % of the polyester resin (B) when a total of the carboxyl group-containing highly saturated nitrile rubber (A1), the highly saturated nitrile rubber (A2), and the polyester resin (B) is made 100 wt %, and the cross-linked rubber has 100% tensile stress of 10 MPa or more.

In the cross-linked rubber of the present invention, preferably the polyester resin (B) is a polyethylene terephthalate, polybutylene terephthalate, and/or polyethylene naphthalate.

Effects of Invention

According to the present invention, it is possible to provide a highly saturated nitrile rubber composition able to give a cross-linked rubber which is excellent in heat resistance and fuel oil resistance and is highly balanced in tensile strength, elongation, and compressive stress and a cross-linked rubber obtained using the highly saturated nitrile rubber composition and having the above properties.

DESCRIPTION OF EMBODIMENTS

Highly Saturated Nitrile Rubber Composition

The highly saturated nitrile rubber composition of the present invention comprises a carboxyl group-containing highly saturated nitrile rubber (A1) containing 15 to 60 wt % of α,β-ethylenically unsaturated nitrile monomer units and 1 to 60 wt % of α,β-ethylenically unsaturated dicarboxylic acid monoester monomer units and having an iodine value of 120 or less, a highly saturated nitrile rubber (A2) containing α,β-ethylenically unsaturated nitrile monomer units in 15 to 60 wt %, having a content of α,β-ethylenically unsaturated dicarboxylic acid monoester monomer units of 0.9 wt % or less, and having an iodine value of 120 or less, and a polyester resin (B), wherein the highly saturated nitrile rubber composition contains 7 to 40 wt % of the carboxyl group-containing highly saturated nitrile rubber (A1), 10 to 78 wt % of the highly saturated nitrile rubber (A2), and 15 to 50 wt % of the polyester resin (B) when a total of the carboxyl group-containing highly saturated nitrile rubber (A1), the highly saturated nitrile rubber (A2), and the polyester resin (B) is made 100 wt %, and the highly saturated nitrile rubber composition is obtained by mixing the carboxyl group-containing highly saturated nitrile rubber (A1), the highly saturated nitrile rubber (A2), and the polyester resin (B) at a temperature of a melting point of the polyester resin (B) or more.

Carboxyl Group-Containing Highly Saturated Nitrile Rubber (A1)

The carboxyl group-containing highly saturated nitrile rubber (A1) used in the present invention is a rubber containing 15 to 60 wt % of α,β-ethylenically unsaturated nitrile monomer units and 1 to 60 wt % of α,β-ethylenically unsaturated dicarboxylic acid monoester monomer units and having an iodine value of 120 or less. The carboxyl group-containing highly saturated nitrile rubber (A1) used in the present invention is obtained by copolymerizing an α,β-ethylenically unsaturated nitrile monomer, α,β-ethylenically unsaturated dicarboxylic acid monoester monomer, and a copolymerizable other monomer added according with need.

The carboxyl group-containing highly saturated nitrile rubber (A1) used in the present invention contains the α,β-ethylenically unsaturated dicarboxylic acid monoester monomer units in the above range. Due to the action of the carboxyl groups contained in such α,β-ethylenically unsaturated dicarboxylic acid monoester monomer units, it exhibits a high affinity with the later explained polyester resin (B). Due to this, the carboxyl group-containing highly saturated nitrile rubber (A1) not only is responsible for the basic properties of the highly saturated nitrile rubber in the highly saturated nitrile rubber composition in the present invention, but also acts as a compatibilizing agent for making the later explained highly saturated nitrile rubber (A2) and the polyester resin (B) compatible.

The α,β-ethylenically unsaturated nitrile monomer is not particularly limited so long as an α,β-ethylenically unsaturated compound having a nitrile group. For example, acrylonitrile; an α-halogenoacrylonitrile such as α-chloroacrylonitrile and α-bromoacrylonitrile; an α-alkylacrylonitrile such as methacrylonitrile; etc. may be mentioned. Among these as well, acrylonitrile and methacrylonitrile are preferable, while acrylonitrile is more preferable. The α,β-ethylenically unsaturated nitrile monomer may be used as single types alone or as a plurality of types combined.

The content of the α,β-ethylenically unsaturated nitrile monomer units is 15 to 60 wt % with respect to the total monomer units, preferably 18 to 55 wt %, more preferably 20 to 50 wt %. If the content of the α,β-ethylenically unsaturated nitrile monomer units is too small, the obtained cross-linked rubber is liable to fall in fuel oil resistance, while conversely if too large, it may fall in cold resistance.

As the α,β-ethylenically unsaturated dicarboxylic acid monoester monomer, a maleic acid monoalkyl ester such as monomethyl maleate, monoethyl maleate, monopropyl maleate, and mono-n-butyl maleate; a maleic acid monocycloalkyl ester such as monocyclopentyl maleate, monocyclohexyl maleate, and monocycloheptyl maleate; a maleic acid monoalkyl cycloalkyl ester such as monomethylcyclopentyl maleate and monoethylcyclohexyl maleate; a fumaric acid monoalkyl ester such as monomethyl fumarate, monoethyl fumarate, monopropyl fumarate, and mono-n-butyl fumarate; a fumaric acid monocycloalkyl ester such as monocyclopentyl fumarate, monocyclohexyl fumarate, and monocycloheptyl fumarate; a fumaric acid monoalkyl cycloalkyl ester such as monomethylcyclopentyl fumarate and monoethylcyclohexyl fumarate; a citraconic acid monoalkyl ester such as monomethyl citraconate, monoethyl citraconate, monopropyl citraconate, and mono-n-butyl citraconate; a citraconic acid monocycloalkyl ester such as monocyclopentyl citraconate, monocyclohexyl citraconate, and monocycloheptyl citraconate; a citraconic acid monoalkyl cycloalkyl ester such as monomethylcyclopentyl citraconate and monoethylcyclohexyl citraconate; an itaconic acid monoalkyl ester such as monomethyl itaconate, monoethyl itaconate, monopropyl itaconate, and mono-n-butyl itaconate; an itaconic acid monocycloalkyl ester such as monocyclopentyl itaconate, monocyclohexyl itaconate, and monocycloheptyl itaconate; an itaconic acid monoalkyl cycloalkyl ester such as monomethylcyclopentyl itaconate and monoethylcyclohexyl itaconate; etc. may be mentioned. Among these as well, maleic acid monoalkyl ester is preferable, maleic acid monoalkyl ester having an alkyl group having 2 to 6 carbon atoms is more preferable, and mono-n-butyl maleate is particularly preferable. The α,β-ethylenically unsaturated dicarboxylic acid monoester monomer may be used as single types alone or as a plurality of types combined.

The content of the α,β-ethylenically unsaturated dicarboxylic acid monoester monomer units is 1 to 60 wt % with respect to the total monomer units, preferably 2 to 20 wt %, more preferably 2 to 10 wt %. If the content of the α,β-ethylenically unsaturated dicarboxylic acid monoester monomer units is too small, the obtained cross-linked rubber ends up deteriorating in tensile strength and elongation. On the other hand, if too great, it ends up deteriorating in heat resistance.

Further, the carboxyl group-containing highly saturated nitrile rubber (A1) used in the present invention preferably also contains conjugated diene monomer units for the obtained cross-linked rubber to have rubber elasticity.

As a conjugated diene monomer foaming the conjugated diene monomer units, a conjugated diene monomer having 4 to 6 carbon atoms such as 1,3-butadiene, isoprene, 2,3-dimethyl-1,3-butadiene, 1,3-pentadiene, and chloroprene is preferable, 1,3-butadiene and isoprene are more preferable, and 1,3-butadiene is particularly preferable. The conjugated diene monomers may be used as single types alone or as a plurality of types combined.

The content of the conjugated diene monomer units (including parts saturated by hydrogenation etc.) is preferably 25 to 84 wt % with respect to the total monomer units, more preferably 25 to 80 wt %, still more preferably 40 to 78 wt %. If the content of the conjugated diene monomer units is too small, the obtained cross-linked rubber is liable to fall in rubber elasticity, while conversely if too great, the heat resistance and chemical stability may be impaired.

Further, the carboxyl group-containing highly saturated nitrile rubber (A1) used in the present invention may be copolymerized with a carboxyl group-containing monomer other than the α,β-ethylenically unsaturated dicarboxylic acid monoester monomer in a range not detracting from the effect of the present invention.

As such a carboxyl group-containing monomer, an α,β-ethylenically unsaturated monocarboxylic acid monomer such as acrylic acid, methacrylic acid, ethylacrylic acid, crotonic acid, and cinnamic acid; a butenedioic acid such as fumaric acid and maleic acid, itaconic acid, citraconic acid, mesaconic acid, glutaconic acid, allylmalonic acid, isopropylidene succinic acid, etc. may be mentioned. Further, as an anhydride of α,β-unsaturated polyvalent carboxylic acid, an anhydride of α,β-ethylenically unsaturated polyvalent carboxylic acid monomer such as maleic anhydride, itaconic anhydride, and citraconic anhydride; etc. may be mentioned.

The content of units of the carboxyl group-containing monomer other than α,β-ethylenically unsaturated dicarboxylic acid monoester monomers is preferably 20 wt % or less with respect to the total monomer units, more preferably 10 wt % or less, still more preferably 5 wt % or less.

Further, the carboxyl group-containing highly saturated nitrile rubber (A1) used in the present invention may be a copolymer of an α,β-ethylenically unsaturated nitrile monomer, α,β-ethylenically unsaturated dicarboxylic acid monoester monomer, conjugated diene monomer, and carboxyl group-containing monomer other than an α,β-ethylenically unsaturated dicarboxylic acid monoester monomer and another monomer copolymerizable with these. As such another monomer, ethylene, an α-olefin monomer, aromatic vinyl monomer, and α,β-ethylenically unsaturated carboxylic acid ester monomer (one without unsubstituted (free) carboxyl group which is not esterified), fluorine-containing vinyl monomer, copolymerizable antiaging agent, etc. may be illustrated.

As the α-olefin monomer, one having 3 to 12 carbon atoms is preferable. For example, propylene, 1-butene, 4-methyl-1-pentene, 1-hexene, 1-octene, etc. may be mentioned.

As the aromatic vinyl monomer, for example, styrene, α-methylstyrene, vinylpyridine, etc. may be mentioned.

As the α,β-ethylenically unsaturated carboxylic acid ester monomer, for example, a (meth)acrylic acid ester (abbreviation for "methacrylic acid ester and acrylic acid ester", same below) having an alkyl group having 1 to 18 carbon atoms such as methyl acrylate, ethyl acrylate, n-butyl acetate, n-dodecyl acrylate, methyl methacrylate, and ethyl methacrylate; a (meth)acrylic acid ester having an alkoxyalkyl group having 2 to 12 carbon atoms such as methoxymethyl acrylate, methoxyethyl acrylate, and methoxyethyl methacrylate; a (meth)acrylic acid ester having a cyanoalkyl group having 2 to 12 carbon atoms such as α-cyanoethyl acrylate, α-cyanoethyl methacrylate, and α-cyanobutyl methacrylate; a (meth)acrylic acid ester having a hydroxyalkyl group having 1 to 12 carbon atoms such as 2-hydroxyethyl acrylate, 2-hydroxypropyl acrylate, and 2-hydroxyethyl methacrylate; a (meth)acrylic acid ester having a fluoroalkyl group having 1 to 12 carbon atoms such as trifluoroethyl acrylate and tetrafluoropropyl methacrylate; an α,β-ethylenically unsaturated dicarboxylic acid dialkyl ester such as dimethyl maleate, dimethyl fumarate, dimethyl itaconate, and diethyl itaconate; a dialkylamino group-containing α,β-ethylenically unsaturated carboxylic acid ester such as dimethylaminomethyl acrylate and diethylaminoethyl acrylate; etc. may be mentioned.

As the fluorine-containing vinyl monomer, for example, a fluoroethylvinyl ether, fluoropropylvinyl ether, o-trifluoromethyl styrene, vinyl pentafluorobenzoate, difluoroethylene, tetrafluoroethylene, etc. may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

These copolymerizable other monomers may be used as a plurality of types together. The content of the units of the other monomer is preferably 50 wt % or less with respect to the total monomer units, more preferably 30 wt % or less, still more preferably 10 wt % or less.

The carboxyl group-containing highly saturated nitrile rubber (A1) used in the present invention has an iodine value of preferably 120 or less, more preferably 60 or less, still more preferably 40 or less, particularly preferably 30 or less. By making the iodine value 120 or less, it is possible to improve the obtained cross-linked rubber in heat resistance.

The carboxyl group-containing highly saturated nitrile rubber (A1) has a polymer Mooney viscosity ($ML_{1+4}$, 100° C.) of preferably 10 to 200, more preferably 20 to 150, still more preferably 30 to 110. If the carboxyl group-containing highly saturated nitrile rubber (A1) is too low in polymer Mooney viscosity, the obtained cross-linked rubber is liable to fall in mechanical properties, while conversely if too high, the rubber composition may fall in processability.

Further, the content of the carboxyl group in the carboxyl group-containing highly saturated nitrile rubber (A1), that is, the number of moles of the carboxyl group per 100 g of the carboxyl group-containing highly saturated nitrile rubber (A1), is preferably 0.006 to 0.116 ephr, more preferably 0.012 to 0.087 ephr, particularly preferably 0.023 to 0.058 ephr. If the content of carboxyl group of the carboxyl group-containing highly saturated nitrile rubber (A1) is too small, the obtained cross-linked rubber ends up falling in properties under a high temperature, specifically the tensile strength under a high temperature. On the other hand, if too great, the compression set resistance and heat resistance may fall.

The method of production of the carboxyl group-containing highly saturated nitrile rubber (A1) used in the present invention is not particularly limited, but it is preferable to copolymerize the above-mentioned monomers by emulsion polymerization using an emulsifier to prepare a latex of a copolymer rubber and hydrogenate it in accordance with need. At the time of emulsion polymerization, it is also possible to use a generally used polymerization secondary material such as an emulsifier, polymerization initiator, and molecular weight adjuster.

The emulsifier is not particularly limited, but, for example, a nonionic emulsifier such as a polyoxyethylene-alkyl ether, polyoxyethylenealkylphenol ether, polyoxyethylenealkyl ester, and polyoxyethylenesorbitanalkyl ester; an anionic emulsifier such as a salt of a fatty acid such as myristic acid, palmitic acid, oleic acid, and linolenic acid, an alkylbenzene sulfonate such as sodium dodecylbenzene sulfonate, a higher alcohol sulfuric acid ester salt, and an alkylsulfosuccinic acid salt; a copolymerizable emulsifier such as a sulfo ester of an $\alpha,\beta$-unsaturated carboxylic acid, a sulfate ester of an $\alpha,\beta$-unsaturated carboxylic acid, and a sulfoalkylaryl ether; etc. may be mentioned. The amount of use of the emulsifier is preferably 0.1 to 10 parts by weight with respect to 100 parts by weight of the total monomer.

The polymerization initiator is not particularly limited so long as a radical initiator, but an inorganic peroxide such as potassium persulfate, sodium persulfate, ammonium persulfate, potassium perphosphate, and hydrogen peroxide; an organic peroxide such as t-butyl peroxide, cumen hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; an azo compound such as azobisisobutyronitrile, azobis-2,4-dimethylvaleronitrile, azobiscyclohexane carbonitrile, and dimethyl azobisisobutyrate; etc. may be mentioned. The polymerization initiator may be used alone or as two types or more combined. As the polymerization initiator, an inorganic or organic peroxide is preferable. When using a peroxide as the polymerization initiator, it may be combined with a reducing agent such as sodium bisulfite and ferrous sulfate as a redox type polymerization initiator. The amount of use of the polymerization initiator is preferably 0.01 to 2 parts by weight with respect to 100 parts by weight of the total monomer.

The molecular weight adjuster is not particularly limited, but mercaptans such as t-dodecyl mercaptan, n-dodecyl mercaptan, and octyl mercaptan; a halogenated hydrocarbon such as carbon tetrachloride, methylene chloride, and methylene bromide; $\alpha$-methylstyrene dimer; a sulfur-containing compound such as tetraethylthiuram disulfide, dipentamethylene thiuram disulfide, and disopropylxantogen disulfide etc. may be mentioned. These may be used alone or as two types or more combined. Among these, mercaptans are preferable, while t-dodecyl mercaptan is more preferable. The amount of use of the molecular weight adjuster is preferably 0.1 to 0.8 part by weight with respect to 100 parts by weight of the total monomer.

As the medium of emulsion polymerization, usually water is used. The amount of the water is preferably 80 to 500 parts by weight with respect to 100 parts by weight of the total monomer.

At the time of the emulsion polymerization, in accordance with need, it is possible to further use a polymerization secondary material such as a stabilizer, dispersant, pH adjuster, deoxidizer, and particle size adjuster. When using these, the types and amounts are not particularly limited.

Note that, when the iodine value of the copolymer obtained by copolymerization is higher than 120, the copolymer may be hydrogenated (hydrogenation reaction) to make the iodine value 120 or less. In this case, the method of hydrogenation is not particularly limited. A known method may be employed.

In the highly saturated nitrile rubber composition of the present invention, the ratio of content of the carboxyl group-containing highly saturated nitrile rubber (A1) is 7 to 40 wt %, preferably 8 to 37 wt %, more preferably 9 to 35 wt %, when the total of the carboxyl group-containing highly saturated nitrile rubber (A1), highly saturated nitrile rubber (A2), and polyester resin (B) is made 100 wt %. If the ratio of content of the carboxyl group-containing highly saturated nitrile rubber (A1) is too small, the obtained cross-linked rubber ends up deteriorating in tensile strength and elongation, while if too great, the heat resistance ends up deteriorating.

Highly Saturated Nitrile Rubber (A2)

The highly saturated nitrile rubber (A2) used in the present invention is a rubber which contains $\alpha,\beta$-ethylenically unsaturated nitrile monomer units in 15 to 60 wt %, has a content of the $\alpha,\beta$-ethylenically unsaturated dicarboxylic acid monoester monomer units of 0.9 wt % or less, and has an iodine value of 120 or less. The highly saturated nitrile rubber (A2) used in the present invention is obtained by copolymerization of an $\alpha,\beta$-ethylenically unsaturated nitrile monomer and a copolymerizable other monomer added according with need.

As the $\alpha,\beta$-ethylenically unsaturated nitrile monomer, it is possible to use one same as in the above-mentioned carboxyl group-containing highly saturated nitrile rubber (A1). In the highly saturated nitrile rubber (A2), the content of the $\alpha,\beta$-ethylenically unsaturated nitrile monomer units is 15 to 60 wt % with respect to the total monomer units, preferably 18 to 55 wt %, still more preferably 20 to 50wt %. Ifthecontentoftheethylenically unsaturated nitrile monomer units is too small, the obtained cross-linked rubber is liable to fall in fuel oil resistance, while conversely if too great, the cold resistance may fall.

Further, in the highly saturated nitrile rubber (A2) used in the present invention, it is preferable that a conjugated diene monomer is used as the monomer copolymerizing with the $\alpha,\beta$-ethylenically unsaturated nitrile monomer in order for the obtained cross-linked rubber to have rubber elasticity. As the conjugated diene monomer, it is possible to use one same as in the above-mentioned carboxyl group-containing highly saturated nitrile rubber (A1). In the highly saturated nitrile rubber (A2), the content of the conjugated diene monomer units (including parts saturated by hydrogenation etc.) is preferably 39.1 to 85 wt % with respect to the total monomer units, more preferably 44.5 to 82 wt %, still more preferably 50 to 80 wt %. If the content of the conjugated diene monomer units is too small, the obtained cross-linked rubber is liable to fall in rubber elasticity, while conversely if too great, the heat resistance and chemical resistance stability may be impaired.

Furthermore, the highly saturated nitrile rubber (A2) used in the present invention may be copolymerized together with an $\alpha,\beta$-ethylenically unsaturated nitrile monomer and conjugated diene monomer and another monomer copolymerizable with these. As such another monomer, in the same way as the above-mentioned carboxyl group-containing highly saturated nitrile rubber (A1), ethylene, an α-olefin monomer, aromatic vinyl monomer, α,β-ethylenically unsaturated carboxylic acid ester monomer (one without unsubstituted (free) carboxyl group which is not esterified), a fluorine-containing vinyl monomer, copolymerizable anti-aging agent, etc. may be illustrated.

Further, in the highly saturated nitrile rubber (A2) used in the present invention, an α,β-ethylenically unsaturated dicarboxylic acid monoester monomer may be used as a copolymerizable other monomer, but the content of the α,β-ethylenically unsaturated dicarboxylic acid monoester monomer units is 0.9 wt % or less with respect to the total monomer units, preferably 0.5 wt % or less. The content of the α,β-ethylenically unsaturated dicarboxylic acid monoester monomer units is particularly preferably 0 wt %. That is, preferably the α,β-ethylenically unsaturated dicarboxylic acid monoester monomer units are substantially not contained. If the content of the α,β-ethylenically unsaturated dicarboxylic acid monoester monomer units is too great, the heat resistance is liable to deteriorate. Note that, as the α,β-ethylenically unsaturated dicarboxylic acid monoester monomer, ones same as in the above-mentioned carboxyl group-containing highly saturated nitrile rubber (A1) may be mentioned.

Further, the highly saturated nitrile rubber (A2) used in the present invention may be copolymerized with a carboxyl group-containing monomer other than the α,β-ethylenically unsaturated dicarboxylic acid monoester monomer in a range not detracting from the effect of the present invention. However, the content of the carboxyl group-containing monomer units other than the α,β-ethylenically unsaturated dicarboxylic acid monoester monomer is preferably 5 wt % or less with respect to the total monomer units, more preferably 3 wt % or less. The content of the carboxyl group-containing monomer units is particularly preferably 0 wt %. That is, preferably the carboxyl group-containing monomer units are not substantially contained. If the content of the carboxyl group-containing monomer units is too great, the heat resistance is liable to deteriorate. Further, as the carboxyl group-containing monomer other than the α,β-ethylenically unsaturated dicarboxylic acid monoester monomer, ones same as in the above-mentioned carboxyl group-containing highly saturated nitrile rubber (A1) may be mentioned.

Further, the carboxyl group-containing highly saturated nitrile rubber (A2) used in the present invention may be obtained by copolymerization of an α,β-ethylenically unsaturated nitrile monomer, α,β-ethylenically unsaturated dicarboxylic acid monoester monomer, conjugated diene monomer, and carboxyl group-containing monomer other than an α,β-ethylenically unsaturated dicarboxylic acid monoester monomer and another monomer copolymerizable with these. As such another monomer, one same as in the above-mentioned carboxyl group-containing highly saturated nitrile rubber (A1) may be mentioned.

The highly saturated nitrile rubber (A2) used in the present invention has an iodine value of 120 or less, preferably 80 or less, particularly preferably 60 or less. In the present invention, by making the iodine value of the highly saturated nitrile rubber (A2) the above range, the obtained cross-linked rubber can be improved in compression set resistance.

The highly saturated nitrile rubber (A2) has a polymer Mooney viscosity ($ML_{1+4}$, 100° C.) of preferably 10 to 200, more preferably 20 to 150, still more preferably 30 to 110. If the highly saturated nitrile rubber (A2) is too low in polymer Mooney viscosity, the obtained cross-linked rubber is liable to fall in mechanical properties, while conversely if too high, the highly saturated nitrile rubber composition may fall in processability.

Further, the content of the carboxyl group in the highly saturated nitrile rubber (A2), that is, the number of moles of the carboxyl group per 100 g of the highly saturated nitrile rubber (A2), is preferably 0.005 ephr or less, more preferably 0.003 ephr or less. 0 ephr is particularly preferable. If the content of the carboxyl group of the highly saturated nitrile rubber (A2) is too great, the compression set resistance and heat resistance may deteriorate.

The method of production of the highly saturated nitrile rubber (A2) used in the present invention is not particularly limited, but may be made similar to the above-mentioned carboxyl group-containing highly saturated nitrile rubber (A1).

In the highly saturated nitrile rubber composition of the present invention, the ratio of content of the highly saturated nitrile rubber (A2) is 10 to 78 wt %, preferably 12 to 70 wt %, more preferably 15 to 65 wt %, when the total of the carboxyl group-containing highly saturated nitrile rubber (A1), highly saturated nitrile rubber (A2), and polyester resin (B) is made 100 wt %. If the ratio of content of the highly saturated nitrile rubber (A2) is too small, the original state physical properties end up deteriorating, while if too great, the heat resistance ends up deteriorating.

Polyester Resin (B)

The highly saturated nitrile rubber composition of the present invention contains a polyester resin (B) in addition to the above-mentioned carboxyl group-containing highly saturated nitrile rubber (A1) and highly saturated nitrile rubber (A2). In the present invention, as the highly saturated nitrile rubber, two types of rubber of the carboxyl group-containing highly saturated nitrile rubber (A1) having a content of α,β-ethylenically unsaturated dicarboxylic acid monoester monomer units in a predetermined range and highly saturated nitrile rubber (A2) having a content of α,β-ethylenically unsaturated dicarboxylic acid monoester monomer units of a predetermined amount or less in a specific ratio of content are jointly used. And by mixing the polyester resin (B) into these in a specific ratio of content, it is possible to make the cross-linked rubber after cross-linking one with an increased 100% tensile stress. Due to this, it is possible to make the cross-linked rubber which is excellent in heat resistance and fuel oil resistance and is highly balanced in tensile strength, elongation, and compressive stress.

The polyester resin (B) used in the present invention is not particularly limited so long as a polymer having an ester bond obtained by polycondensation of a polyvalent alcohol and a polybasic acid or polybasic acid ester compound, but, for example, a generally known polyester resin such as an alkyd resin, maleic acid resin, saturated polyester resin, unsaturated polyester resin, etc. may be used.

As the polyvalent alcohol, for example, ethylene glycol, diethylene glycol, triethylene glycol, propylene glycol, butylene glycol, trimethylene glycol, cyclohexane dimethanol, etc. may be used.

Further, as the polybasic acid, for example, phthalic acid, fumaric acid, adipic acid, naphthalene-2,6-dicarboxylic acid, etc. may be used.

Among these as well, from the viewpoint of the heat resistance, mechanical strength, etc., as the polyester resin (B), an aromatic polyester resin is particularly preferable. As the aromatic polyester resin, ones obtained using a polyvalent alcohol comprised of ethylene glycol, butylene glycol or trimethylene glycol and using a polybasic acid comprised of phthalic acid or naphthalene-2,6-dicarboxylic acid such as polyethylene terephthalate, polybutylene terephthalate, and polyethylene naphthalate are mentioned.

The weight average molecular weight of the polyester resin (B) used in the present invention is preferably 40,000 to 100,000, more preferably 60,000 to 100,000. Further, the melting point of the polyester resin (B) is preferably 180 to 300° C., more preferably 190 to 280° C., still more preferably 200 to 260° C. If the melting point is in the above range, the heat deterioration of the ingredients at the time of processing them can be effectively prevented while the obtained cross-linked rubber can be made good in heat resistance. Note that, the melting point of the polyester resin (B) can, for example, be found from the peak temperature of the heat of melting using a differential scanning calorimeter.

In the highly saturated nitrile rubber composition of the present invention, the ratio of content of the polyester resin (B) is 15 to 50 wt %, preferably 18 to 45 wt %, more preferably 20 to 40 wt %, when the total of the carboxyl group-containing highly saturated nitrile rubber (A1), highly saturated nitrile rubber (A2), and polyester resin (B) is made 100 wt %. If the ratio of content of the polyester resin (B) is too small, the 100% tensile stress falls and, due to this, the heat resistance, fuel oil resistance, tensile strength, and compressive stress end up deteriorating. On the other hand, if too large, the roll processability ends up deteriorating.

Preparation of Highly Saturated Nitrile Rubber Composition

The highly saturated nitrile rubber composition of the present invention is prepared by mixing the above-mentioned carboxyl group-containing highly saturated nitrile rubber (A1), highly saturated nitrile rubber (A2), and polyester resin (B) at a temperature of the melting point of the polyester resin (B) or more. In the present invention, by mixing at a temperature of the melting point of the polyester resin (B) or more, it is possible to mix the polyester resin (B) in a molten state, so it is possible to uniformly mix the carboxyl group-containing highly saturated nitrile rubber (A1), highly saturated nitrile rubber (A2), and polyester resin (B). Further, due to this, the effect of mixing in the polyester resin (B), that is, the cross-linked rubber after cross-linking being raised in 100% tensile stress and due to this being able to be made excellent in heat resistance and fuel oil resistance and highly balanced in tensile strength, elongation, and compressive stress, can be suitably obtained. On the other hand, if making the mixing temperature a temperature of less than the melting point of the polyester resin (B), it is not possible to uniformly mix the ingredients and the obtained cross-linked rubber ends up inferior in tensile strength and elongation.

The temperature at the time of mixing the carboxyl group-containing highly saturated nitrile rubber (A1), highly saturated nitrile rubber (A2), and polyester resin (B) need only be a temperature of the melting point of the polyester resin (B) or more, but a temperature of 5° C. or more higher than the melting point of the polyester resin (B) is preferable, while a temperature 10° C. or more higher than the melting point of the polyester resin (B) is more preferable. The upper limit of the mixing temperature is not particularly limited, but from the viewpoint of effective prevention of heat deterioration of the ingredients, is preferably 400° C. or less, more preferably 350° C. or less.

Further, the mixing method when mixing the carboxyl group-containing highly saturated nitrile rubber (A1), highly saturated nitrile rubber (A2), and polyester resin (B) is not particularly limited, but from the viewpoint of better raising the mixability of the ingredients, a mixing method in which a shear strength is imparted, for example, a method of mixing using an extruder such as twin-screw extruder, a method of using a closed type kneading machine or roll kneading machine such as a kneader, Bambury mixer, Brabender mixer, and internal mixer etc. may be mentioned.

Note that, when kneading the carboxyl group-containing highly saturated nitrile rubber (A1), highly saturated nitrile rubber (A2), and polyester resin (B), it is also possible to simultaneously knead the later explained antiaging agent or various other compounding agents and other rubber.

Cross-Linkable Nitrile Rubber Composition

The cross-linkable nitrile rubber composition of the present invention comprises the above-mentioned highly saturated nitrile rubber composition of the present invention to which a cross-linking agent (C) is mixed.

The cross-linking agent (C) is not particularly limited, but an organic peroxide cross-linking agent, sulfur-based cross-linking agent, resin cross-linking agent, polyvalent amine compound, polyvalent epoxy compound, polyvalent isocyanate compound, polyvalent alcohol compound, aziridine compound, basic metal oxide, organometallic halogenate, etc. may be mentioned, but among these as well, from the viewpoint of the improvement of the processability of the cross-linkable nitrile rubber composition and, further, better increasing the mechanical strength of the obtained cross-linked rubber, an organic peroxide cross-linking agent is preferable.

As the organic peroxide cross-linking agent, a conventional known one may be used. Dicumyl peroxide, cumen hydroperoxide, t-butylcumyl peroxide, p-menthane hydroperoxide, di-t-butyl peroxide, 1,3-bis (t-butylperoxyisopropyl)benzene, 1,4-bis (t-butylperoxyisopropyl)benzene, 1,1-di-t-butylperoxy-3,3-trimethylcyclohexane, 4,4-bis-(t-butylperoxy)-n-butyl valerate, 2,5-dimethyl-2,5-di-t-butylperoxyhexane, 2,5-dimethyl-2,5-di-t-butylperoxyhexine-3, 1,1-di-t-butylperoxy-3,5,5-trimethylcyclohexane, p-chlorobenzoyl peroxide, t-butylperoxyisopropyl carbonate, t-butyl peroxybenzoate, etc. may be mentioned. Among these as well, 1,3-bis (t-butylperoxyisopropyl)benzene is preferable. These may be used as single types alone or as a plurality of types combined.

In the cross-linkable nitrile rubber composition of the present invention, the amount of the cross-linking agent (C) is preferably 0.5 to 20 parts by weight with respect to 100 part in total of the carboxyl group-containing highly saturated nitrile rubber (A1) and highly saturated nitrile rubber (A2), more preferably 1 to 15 parts by weight, still more preferably 2 to 10 parts by weight. By increasing the amount of the cross-linking agent (C), it is possible to improve the tensile strength of the obtained cross-linked rubber, but on the other hand, the elongation tends to end up decreasing along with the increase of the amount of the cross-linking agent (C), so from such a viewpoint, in the present invention, the amount of the cross-linking agent (C) is preferably made the above range.

Further, the cross-linkable nitrile rubber composition of the present invention may have blended into it, in addition to the above, other compounding agents which are usually used in the field of rubber processing, for example, a reinforcing agent such as carbon black, silica and staple fiber, filler such as calcium carbonate and clay, cross-linking accelerator, cross-linking aid such as polyfunctional methacrylate monomer, cross-linking retarder, antiaging agent, antioxidant, photostabilizer, scorch preventer such as primary amine, silane coupling agent, plasticizer, processing aid, slip agent, tackifier, lubricant, flame retardant, antifungal agent, acid acceptor, antistatic agent, pigment, foam agent, etc. The amounts of these compounding agents are not particularly limited so long as in ranges not detracting from the object or effects of the present invention and may be amounts according to the purposes of inclusion.

The cross-linkable nitrile rubber composition of the present invention may contain, to an extent where the effect of the present invention is not impaired, another polymer besides the above-mentioned carboxyl group-containing highly saturated nitrile rubber (A1), highly saturated nitrile rubber (A2), and polyester resin (B). As the other polymer, acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, polyisoprene rubber, etc. may be mentioned. When blending in the other polymer, the amount in the cross-linkable nitrile rubber composition is preferably 30 parts by weight or less with respect to 100 parts by weight of the total of the carboxyl group-containing highly saturated nitrile rubber (A1), highly saturated nitrile rubber (A2), and polyester resin (B), more preferably 20 parts by weight or less, still more preferably 10 parts by weight or less.

Preparation of Cross-Linkable Nitrile Rubber Composition

The method of preparation of the cross-linkable nitrile rubber composition of the present invention is not particularly limited, but it is possible to knead, with the highly saturated nitrile rubber composition of the present invention obtained above (composition obtained by mixing carboxyl group-containing highly saturated nitrile rubber (A1), highly saturated nitrile rubber (A2), and polyester resin (B) at temperature of melting point of polyester resin (B) or more), the ingredient other than the cross-linking agent (C) and an ingredient unstable against heat at preferably 10 to 200° C., more preferably 20 to 170° C., by a mixing machine such as a Bambury mixer, Brabender mixer, internal mixer, and kneader, transfer the mixture to rolls etc., then add the cross-linking agent (C) and the ingredient unstable against heat such as cross-linking aid for secondary kneading preferably under conditions of 10 to 80° C.

Cross-Linked Rubber

The cross-linked rubber of the present invention is obtained by cross-linking the above-mentioned cross-linkable nitrile rubber composition of the present invention.

The cross-linked rubber of the present invention can be produced by forming the above-mentioned cross-linkable nitrile rubber composition of the present invention by, for example, a forming machine corresponding to the shape of the product to be produced, for example, an extruder, injection molding machine, press, rolls, etc., heating it to cause a cross-linking reaction, then fixing the shape as cross-linked rubber. In this case, the composition can be formed in advance, then cross-linked or may be formed and simultaneously cross-linked. The forming temperature is usually 10 to 200° C., preferably 25 to 120° C. The cross-linking temperature is usually 100 to 200° C., preferably is 130 to 190° C., while the cross-linking time is usually 1 minute to 24 hours, preferably 2 minutes to 6 hours.

Further, the cross-linked rubber sometimes may be cross-linked at its surface, but not sufficiently cross-linked at its inside depending upon its shape, size, etc., so may be further heated for secondary cross-linking.

As the heating method, a general method used for cross-linking rubber such as press heating, steam heating, oven heating, and hot air heating may be suitably selected.

The thus obtained cross-linked rubber of the present invention is one obtained using the above-mentioned highly saturated nitrile rubber composition and cross-linkable nitrile rubber composition of the present invention, so is raised in 100% tensile stress and thereby is excellent in heat resistance and fuel oil resistance and is highly balanced in tensile strength, elongation, and compressive stress. The cross-linked rubber of the present invention in particular has a 100% tensile stress of preferably 10 MPa or more, more preferably 15 MPa or more, particularly preferably 20 MPa or more. Therefore, the cross-linked rubber of the present invention, taking advantage of such a characteristic, can be used for various seal members such as O-rings, packings, diaphragms, oil seals, shaft seals, bearing seals, well head seals, air compressor seals, seals for sealing in Freon or fluorohydrocarbons or carbon dioxide which is used for compressors for cooling devices for air-conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, and top cover use gaskets for hard disk drives; various types of rolls such as printing use rolls, ironmaking use rolls, papermaking use rolls, industrial use rolls, and office equipment use rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuits boards or other binders, fuel cell separators and also other broad applications in the electronics field. Among these as well, since the cross-linked rubber of the present invention is particularly excellent in tensile strength at ordinary temperature and tensile strength at a high temperature, it is suitable as a belt, hose, roll, seal, or gasket, in particular is especially suitable as a belt. Among these as well, the cross-linked rubber of the present invention can be preferably used for seal member applications. In particular, since the cross-linked rubber of the present invention is highly balanced in tensile strength, elongation, and compressive stress, it is kept low in deformation even under high pressure conditions, so can be particularly suitably used for high pressure seal member (for example, a seal member used in a state where 1 MPa or more pressure is applied) applications.

Other Aspect

Further, according to the present invention, as another aspect different from the above-mentioned aspect, there is provided a cross-linked rubber obtained by ross-linking a cross-linkable nitrile rubber composition, the cross-linkable nitrile rubber composition containing:

a carboxyl group-containing highly saturated nitrile rubber (A1) containing 15 to 60 wt % of $\alpha,\beta$-ethylenically unsaturated nitrile monomer units and 1 to 60 wt % of $\alpha,\beta$-ethylenically unsaturated dicarboxylic acid monoester monomer units and having an iodine value of 120 or less;

a highly saturated nitrile rubber (A2) containing $\alpha,\beta$-ethylenically unsaturated nitrile monomer units in 15 to 60 wt %, having a content of $\alpha,\beta$-ethylenically unsaturated dicarboxylic acid monoester monomer units of 0.9 wt % or less, and having an iodine value of 120 or less;

a polyester resin (B); and a cross-linking agent (C), wherein the cross-linked rubber contains 7 to 40 wt % of the carboxyl group-containing highly saturated nitrile rubber (A1), 10 to 78 wt % of the highly saturated nitrile rubber (A2), and 15 to 50 wt % of the polyester resin (B) when a total of the carboxyl group-containing highly saturated nitrile rubber (A1), the highly saturated nitrile rubber (A2), and the polyester resin (B) is made 100 wt %, and the cross-linked rubber has 100% tensile stress of 10 MPa or more.

According to the other aspect of the present invention, there is provided a cross-linked rubber obtained by cross-linking a cross-linkable nitrile rubber composition containing the above-mentioned carboxyl group-containing highly saturated nitrile rubber (A1), highly saturated nitrile rubber (A2), polyester resin (B), and cross-linking agent (C) and having a 100% tensile stress of 10 MPa or more, so is excellent in heat resistance and fuel oil resistance and is highly balanced in tensile strength, elongation, and compressive stress and can be suitably used for the various applications explained above. Note that, the 100% tensile stress is preferably 15 MPa or more, more preferably 20 MPa or more.

Note that, as the carboxyl group-containing highly saturated nitrile rubber (A1), highly saturated nitrile rubber (A2), polyester resin (B), and cross-linking agent (C) forming the cross-linkable nitrile rubber composition used in the other aspect, it is possible to use ones same as in the above-mentioned aspect in same amounts. Further, the cross-linkable nitrile rubber composition used in the other aspect can be prepared in the same way as the above-mentioned aspect. In the other aspect of the present invention, the method of making the 100% tensile stress 10 MPa or more is not particularly limited, but, for example, the method of mixing the carboxyl group-containing highly saturated nitrile rubber (A1), highly saturated nitrile rubber (A2), and polyester resin (B) at a temperature of the melting point of the polyester resin (B) or more when mixing them etc. may be mentioned. Further, the cross-linking and fainting conditions may be made ones similar to the above-mentioned aspect.

EXAMPLES

Below, examples and comparative examples were given to explain the present invention in more detail, but the present invention is not limited to these examples. Below, unless otherwise indicated, "parts" are based on weight. The physical properties and tests of physical properties or methods of evaluation were as follows.

Rubber Composition

The ratios of content of the monomer units forming the highly saturated nitrile rubber were measured by the following method.

That is, the ratio of content of the mono-n-butyl maleate units was calculated by adding 100 ml of 2-butanone to 0.2 g of 2 mm square pieces highly saturated nitrile rubber, stirring the mixture for 16 hours, then adding 20 ml of ethanol and 10 ml of water, stirring while using a 0.02N hydrous ethanol solution of potassium hydroxide and thymol phthalein as an indicator for titration at room temperature to find the number of moles of carboxyl group with respect to 100 g of highly saturated nitrile rubber, and converting the found number of moles to the amount of mono-n-butyl maleate units.

The ratios of contents of the 1,3-butadiene units and saturated butadiene units were calculated by using highly saturated nitrile rubber to measure the iodine value before the hydrogenation reaction and after the hydrogenation reaction (according to JIS K 6235).

The ratio of content of acrylonitrile units was calculated in accordance with JIS K6384 by measuring the nitrogen content in the highly saturated nitrile rubber by the Kjeldahl method.

Iodine Value

The iodine value of the highly saturated nitrile rubber was measured based on JIS K 6235.

Content of Carboxyl Groups

To 0.2 g of 2 mm square pieces of highly saturated nitrile rubber, 100 ml of 2-butanol was added. The mixture was stirred for 16 hours, then 20 ml of ethanol and 10 ml of water were added. While stirring, using a 0.02N hydrous ethanol solution of potassium hydroxide, titration was performed at room temperature using thymol phthalein as an indicator to find the content of carboxyl group of highly saturated nitrile rubber as the number of moles of carboxyl group with respect to 100 g of highly saturated nitrile rubber (units: ephr).

Mooney Viscosity (Polymer Mooney)

The Mooney viscosity of the highly saturated nitrile rubber (polymer Mooney) was measured in accordance with JIS K 6300-1 (units: [$ML_{1+4}$, 100° C.]).

Original State Physical Properties (Tensile Strength, Elongation, 100% Tensile Stress)

The cross-linkable nitrile rubber composition was placed in a mold of a vertical 15 cm, horizontal 15 cm, and depth 0.2 cm and press-famed at 170° C. for 20 minutes while pressing it by a pressure of 10 MPa to obtain a sheet-shaped cross-linked rubber. The obtained sheet-shaped cross-linked rubber was punched by a No. 3 type dumbbell shaped cutter to prepare a test piece. Further, the obtained test piece was used to measure the tensile strength, elongation, and 100% tensile stress of the cross-linked rubber in accordance with JIS K6251.

Heat Aging Resistance

In the same way as the evaluation of the original state physical properties, sheet-shaped cross-linked rubber was obtained, then was tested for heat aging in the air in accordance with JIS K 6257. Specifically, the obtained sheet-shaped cross-linked rubber was held in a gear oven under a condition of a temperature of 150° C. and 168 hours, then was subjected to a tensile test in the same way as the above original state physical properties. The following formula was used to calculate the change ratio of elongation. The smaller the change ratio of elongation, the better the heat aging resistance can be judged.

Change ratio of elongation (%)=[((elongation after heat aging)−(elongation in original state))/(elongation in original state)]×100

Fuel Oil Resistance Test

In the same way as the evaluation of the original state physical properties, sheet-shaped cross-linked rubber was obtained, then was tested for fuel oil resistance in accordance with JIS K 6258 by immersing the cross-linked rubber in a test fuel oil (Fuel C) of isooctane/toluene=50/50 (volume ratio) under a condition of a temperature of 40° C. and 168 hours. Further, the volumes of the cross-linked rubber before and after immersion in the test fuel oil were measured and the change ratio of volume after immersion ΔV (units: %) was calculated in accordance with "change ratio of volume ΔV=([volume after immersion−volume before immersion]/volume before immersion)×100" to thereby evaluate the fuel oil resistance. The smaller the absolute value of the change ratio of volume ΔV, the smaller the degree of swelling due to the fuel oil and the better the fuel oil resistance can be judged.

Compression Test

The cross-linkable nitrile rubber composition was placed in a mold of a diameter of 2.9 cm and depth of 1.25 cm and was press-famed at 170° C. for 25 minutes while applying a press pressure of 10 MPa to obtain a cylindrical columnar cross-linked rubber. The obtained test piece was compressed by 10% at 23° C. and was measured for compressive stress (N) after 1 minute from compression. The value of the compressive stress (10% compressive stress) was calculated by rounding off the ones place of the obtained measurement value.

Synthesis Example 1 (Synthesis of Carboxyl Group-Containing Highly Saturated Nitrile Rubber (a1-1))

To a reactor, 180 parts of ion exchanged water, 25 parts of a concentration 10 wt % sodium dodecylbenzenesulfonate solution, 36 parts of acrylonitrile, 4 parts of mono-n-butyl maleate, and 0.5 part of t-dodecylmercaptan (molecular weight adjuster) were charged in that order. The inside gas was replaced with nitrogen 3 times, then 60 parts of 1,3-butadiene was charged. Next, the reactor was held at 5° C., 0.1 part of cumen hydroperoxide (polymerization initiator) was charged, and the result was stirred while continuing the polymerization reaction. When the polymerization conversion rate reached 85%, 0.1 part of concentration 10 wt % hydroquinone aqueous solution (polymerization terminator) was added to stop the polymerization reaction. Next, the residual monomers were removed at a water temperature of 60° C. under reduced pressure to obtain a latex of a carboxyl group-containing nitrile rubber (solid content concentration of about 30 wt %).

Next, the above obtained latex of the carboxyl group-containing nitrile rubber and a palladium catalyst (solution of 1 wt % palladium acetate acetone solution and equal weight of ion exchanged water mixed together) was added in an autoclave so that the amount of palladium became 1,000 ppm by weight with respect to the dry weight of the rubber contained in the latex of the carboxyl group-containing nitrile rubber. A hydrogenation reaction was performed at a hydrogen pressure of 3 MPa and a temperature of 50° C. for 6 hours to obtain a latex of the carboxyl group-containing highly saturated nitrile rubber (a1-1).

Further, to the obtained latex, two volumes of methanol were added to coagulate it, then the result was dried in vacuo at 60° C. for 12 hours to thereby obtain a carboxyl group-containing highly saturated nitrile rubber (a1-1). The composition of the monomer units of the obtained carboxyl group-containing highly saturated nitrile rubber (a1-1) was 36 wt % of acrylonitrile units, 4 wt % of mono-n-butyl maleate units, and 60 wt % of 1,3-butadiene units (hydrogenated parts also included). Further, the iodine value was 10, the content of carboxyl group was $3.0 \times 10^{-2}$ ephr, and the polymer Mooney viscosity [$ML_{1+4}$, 100° C.] was 55.

Synthesis Example 2 (Synthesis of Highly Saturated Nitrile Rubber (a2-1))

Inside a reactor, to 200 parts of ion exchanged water, 0.2 part of sodium carbonate was dissolved. To this, 2.25 parts of fatty acid potassium soap (potassium salt of fatty acid) was added to prepare a soap water solution. Further, to the obtained soap water solution, 38 parts of acrylonitrile and 0.45 part of t-dodecylmercaptan (molecular weight adjuster) were charged in that order. The inside gas was replaced with nitrogen 3 times, then 62 parts of 1,3-butadiene was charged. Next, the inside of the reactor was held at 5° C., 0.1 part of cumen hydroperoxide (polymerization initiator) and suitable amounts of a reducing agent and chelating agent were charged, then the polymerization reaction was started. Further, when the polymerization conversion rate reached 85%, 0.1 part of a concentration 10% hydroquinone (polymerization terminator) aqueous solution was added to stop the polymerization reaction, then a water temperature 60° C. rotary evaporator was used to remove the residual monomers and obtain the latex of nitrile rubber (solid content concentration about 25 wt %).

Next, the above obtained latex was added to an aqueous solution of aluminum sulfate in an amount of 3 wt % with respect to the nitrile rubber contained in the latex and stirred to cause the latex to coagulate and the result was washed with water and separated by filtration, then dried in vacuo at 60° C. for 12 hours to obtain nitrile rubber. Further, the obtained nitrile rubber was dissolved in acetone so as to become a concentration 12% solution, the solution was placed in an autoclave, a palladium-silica catalyst was added in an amount of 500 weight ppm with respect to the nitrile rubber, and the result was reacted by a hydrogenation reaction by a hydrogen pressure 3.0 MPa. After the end of the hydrogenation reaction, the mixture was poured into a large amount of water to cause it to coagulate and the result was separated by filtration and dried to thereby obtain the highly saturated nitrile rubber (a2-1). The composition of the obtained highly saturated nitrile rubber (a2-1) was 36 wt % of acrylonitrile units and 64 wt % of butadiene units (including saturated parts), the iodine value was 117, and the polymer Mooney viscosity [$ML_{1+4}$, 100° C.] was 85. Further, the highly saturated nitrile rubber (a2-1) was measured for carboxyl group content in accordance with the above method, whereupon it was below the detection limit. No carboxyl groups were substantially contained.

Example 1

20 parts of the carboxyl group-containing highly saturated nitrile rubber (a1-1) obtained in Synthesis Example 1, 50 parts of the highly saturated nitrile rubber (a2-1) obtained in Synthesis Example 2, and 30 parts of polybutylene terephthalate (product name "Toraycon 1401-X06", made by Toray, melting point found by peak temperature of the heat of melting measured using a differential scanning calorimeter: 225° C.) were kneaded using a twin-screw extruder at 235° C. to obtain a highly saturated nitrile rubber composition.

Further, using a Bambury mixer, to 100 parts of the highly saturated nitrile rubber composition obtained above, 20 parts of N550 carbon black (product name "Seast SO", made by Tokai Carbon, carbon black), 5 parts of a polyether ester-based plasticizer ("product name "ADK Cizer RS-700", made by Adeka, plasticizer), 1 part of stearic acid, and 1.5 parts of 4,4'-di-(α,α-dimethylbenzyl)diphenylamine (product name "Nocrac CD", made by Cuchi Shinko Chemical Industrial, antiaging agent) were added and mixed. Next, the mixture was transferred to rolls and 7 parts of 1,3-bis(t-butylperoxyisopropyl)benzene 40% product (product name "VulCup 40KE", made by Arkema, organic peroxide cross-linking agent) was added and kneaded to obtain a cross-linkable nitrile rubber composition.

Further, the above-mentioned methods were used to evaluate the original state physical properties and heat aging resistance and perform the fuel oil resistance test and compression test. The results are shown in Table 1.

Example 2

Except for using 30 parts of polyethylene terephthalate (product name "TRN-8560FF", made by Teijin, melting point found by peak temperature of the heat of melting measured using a differential scanning calorimeter: 255° C.) instead of 30 parts of polybutylene terephthalate and changing the kneading temperature from 235° C. to 265° C. when using the twin-screw extruder to obtain the highly saturated nitrile rubber composition, the same procedure was followed as in Example 1 to prepare the highly saturated nitrile rubber composition and cross-linkable nitrile rubber composition and the same procedures were followed to evaluate them. The results are shown in Table 1.

Example 3

Except for using 30 parts of polyethylene naphthalate (product name "Teonex TN8065S", made by Teijin, melting point found by peak temperature of the heat of melting measured using a differential scanning calorimeter: 265° C.) instead of 30 parts of polybutylene terephthalate and changing the kneading temperature from 235° C. to 275° C. when using the twin-screw extruder to obtain the highly saturated nitrile rubber composition, the same procedure was followed as in Example 1 to prepare the highly saturated nitrile rubber composition and cross-linkable nitrile rubber composition and the same procedures were followed to evaluate them. The results are shown in Table 1.

Comparative Example 1

Except for changing the amount of the carboxyl group-containing highly saturated nitrile rubber (a1-1) from 20 parts to 5 parts and changing the amount of the highly saturated nitrile rubber (a2-1) from 50 parts to 65 parts when using the twin-screw extruder to obtain the highly saturated nitrile rubber composition, the same procedure was followed as in Example 1 to prepare the highly saturated nitrile rubber composition and cross-linkable nitrile rubber composition and the same procedures were followed to evaluate them. The results are shown in Table 1.

Comparative Example 2

Except for changing the amount of the highly saturated nitrile rubber (a2-1) from 50 parts to 70 parts and changing the amount of polybutylene terephthalate from 30 parts to 10 parts, when using the twin-screw extruder to obtain the highly saturated nitrile rubber composition, the same procedure was followed as in Example 1 to prepare the highly saturated nitrile rubber composition and cross-linkable nitrile rubber composition and the same procedures were followed to evaluate them. The results are shown in Table 1.

Comparative Example 3

Except for using a roll mixer instead of a twin-screw extruder and employing the method of kneading the carboxyl group-containing highly saturated nitrile rubber (a1-1), highly saturated nitrile rubber (a2-1), and polybutylene terephthalate at the temperature 100° C. when obtaining the highly saturated nitrile rubber composition, the same procedure was followed as in Example 1 to prepare the highly saturated nitrile rubber composition and cross-linkable nitrile rubber composition and the same procedures were followed to evaluate them. The results are shown in Table 1.

Comparative Example 4

Except for using a Bambury mixer instead of a twin-screw extruder and employing the method of kneading the carboxyl group-containing highly saturated nitrile rubber (a1-1), highly saturated nitrile rubber (a2-1), and polybutylene terephthalate at the temperature 200° C. when obtaining the highly saturated nitrile rubber composition, the same procedure was followed as in Example 1 to prepare the highly saturated nitrile rubber composition and cross-linkable nitrile rubber composition and the same procedures were followed to evaluate them. The results are shown in Table 1.

TABLE 1

| | | Examples | | | Comparative Examples | | | |
|---|---|---|---|---|---|---|---|---|
| | | 1 | 2 | 3 | 1 | 2 | 3 | 4 |
| Formulation | | | | | | | | |
| Carboxyl group-containing highly saturated nitrile rubber (a1-1) | (parts) | 20 | 20 | 20 | 5 | 20 | 20 | 20 |
| Highly saturated nitrile rubber (a2-1) | (parts) | 50 | 50 | 50 | 65 | 70 | 50 | 50 |
| Polybutylene terephthalate (melting point: 225° C.) | (parts) | 30 | — | — | 30 | 10 | 30 | 30 |
| Polyethylene terephthalate (melting point: 255° C.) | (parts) | — | 30 | — | — | — | — | — |
| Polyethylene naphthalate (melting point: 265° C.) | (parts) | — | — | 30 | — | — | — | — |

TABLE 1-continued

| | | Examples | | | Comparative Examples | | | |
|---|---|---|---|---|---|---|---|---|
| | | 1 | 2 | 3 | 1 | 2 | 3 | 4 |
| FEF carbon black | (parts) | 20 | 20 | 20 | 20 | 20 | 20 | 20 |
| Polyether ester-based plasticizer | (parts) | 5 | 5 | 5 | 5 | 5 | 5 | 5 |
| Stearic acid | (parts) | 1 | 1 | 1 | 1 | 1 | 1 | 1 |
| 4,4'-di-(α,α-dimethylbenzyl)diphenylamine | (parts) | 1.5 | 1.5 | 1.5 | 1.5 | 1.5 | 1.5 | 1.5 |
| 1,3-bis(t-butylperoxyisopropyl)benzene (40% product) | (parts) | 7 | 7 | 7 | 7 | 7 | 7 | 7 |
| Method of kneading carboxyl group-containing highly saturated nitrile rubber, highly saturated nitrile rubber, and polyester resin | | Twin-screw extruder | Twin-screw extruder | Twin-screw extruder | Twin-screw extruder | Twin-screw extruder | Roll mixer | Bambury mixer |
| Kneading temperature of carboxyl group-containing highly saturated nitrile rubber, highly saturated nitrile rubber, and polyester resin | (° C.) | 235 | 265 | 275 | 235 | 235 | 100 | 200 |
| Original state physical properties | | | | | | | | |
| Tensile strength | (MPa) | 28.3 | 29.3 | 28.7 | 24.5 | 25.6 | 23.1 | 22.7 |
| Elongation | (%) | 130 | 140 | 140 | 80 | 320 | 70 | 70 |
| 100% tensile stress | (MPa) | 23.6 | 23.7 | 23.9 | — | 8.10 | — | — |
| Heat aging resistance | | | | | | | | |
| Change ratio of elongation | (%) | −2 | −2 | −3 | −2 | −18 | −3 | −2 |
| Fuel oil resistance test (Fuel C, 40° C., 72 hours) | | | | | | | | |
| Change ratio of volume | (%) | 38 | 38 | 38 | 38 | 58 | 37 | 37 |
| Compression test | | | | | | | | |
| 10% compressive stress | (N) | 310 | 310 | 310 | 380 | 160 | 370 | 370 |

As shown in Table 1, when using a highly saturated nitrile rubber composition obtained by mixing the carboxyl group-containing highly saturated nitrile rubber (A1), highly saturated nitrile rubber (A2), and polyester resin (B) in the ratios prescribed in the present invention at a temperature of the melting point of the polyester resin (B) or more, the obtained cross-linked rubber had a 100% tensile stress of 10 MPa or more, was excellent in heat resistance and fuel oil resistance, and was highly balanced in tensile strength, elongation, and 10% compressive stress (Examples 1 to 3).

On the other hand, if the content of the carboxyl group-containing highly saturated nitrile rubber (A1) was too small, the obtained cross-linked rubber was inferior in tensile strength and elongation. Further, the elongation was less than 100%, so the 100% tensile stress could not be measured (Comparative Example 1).

Further, if the amount of the polyester resin (B) was too small, the obtained cross-linked rubber had a 100% tensile stress of less than 10 MPa and was inferior in heat resistance, fuel oil resistance, tensile strength, and 10% compressive stress (Comparative Example 2).

Furthermore, if containing the carboxyl group-containing highly saturated nitrile rubber (A1), highly saturated nitrile rubber (A2), and polyester resin (B) in the ratios predetermined in the present invention, but these were mixed at a temperature of less than the melting point of the polyester resin (B), the obtained cross-linked rubber was inferior in tensile strength and elongation and, further, had an elongation of less than 100%, so the 100% tensile stress could not be measured (Comparative Examples 3 and 4).

The invention claimed is:

1. A highly saturated nitrile rubber composition comprising
 a carboxyl group-containing highly saturated nitrile rubber (A1) containing 15to 60 wt % of α,β-ethylenically unsaturated nitrile monomer units and 1 to 60 wt % of α,β-ethylenically unsaturated dicarboxylic acid monoester monomer units and having an iodine value of 120 or less,
 a highly saturated nitrile rubber (A2) containing α,β-ethylenically unsaturated nitrile monomer units in 15 to 60 wt %, having a content of α,β-ethylenically unsaturated dicarboxylic acid monoester monomer units of 0.9 wt % or less, and having an iodine value of 120 or less, and
 a polyester resin (B),
 wherein the highly saturated nitrile rubber composition contains 7 to 40 wt % of the carboxyl group-containing highly saturated nitrile rubber (A1), 10 to 78 wt % of the highly saturated nitrile rubber (A2), and 15 to 50 wt % of the polyester resin (B) when a total of the carboxyl group-containing highly saturated nitrile rubber (A1), the highly saturated nitrile rubber (A2), and the polyester resin (B) is made 100 wt %, and
 the highly saturated nitrile rubber composition is obtained by mixing the carboxyl group-containing highly saturated nitrile rubber (A1), the highly saturated nitrile rubber (A2), and the polyester resin (B) at a temperature of a melting point of the polyester resin (B) or more.

2. The highly saturated nitrile rubber composition according to claim 1 wherein the polyester resin (B) is polyethylene terephthalate, polybutylene terephthalate, and/or polyethylene naphthalate.

3. A cross-linkable nitrile rubber composition obtained by blending a cross-linking agent (C) into the highly saturated nitrile rubber composition according to claim 1.

4. A cross-linked rubber obtained by cross-linking the cross-linkable nitrile rubber composition according to claim 3.

5. A cross-linked rubber obtained by cross-linking a cross-linkable nitrile rubber composition, the cross-linkable nitrile rubber composition containing:
 a carboxyl group-containing highly saturated nitrile rubber (A1) containing 15to 60 wt % of α,β-ethylenically unsaturated nitrile monomer units and 1 to 60 wt % of α,β-ethylenically unsaturated dicarboxylic acid monoester monomer units and having an iodine value of 120 or less;

a highly saturated nitrile rubber (A2) containing α,β-ethylenically unsaturated nitrile monomer units in 15 to 60 wt %, having a content of α,β-ethylenically unsaturated dicarboxylic acid monoester monomer units of 0.9 wt % or less, and having an iodine value of 120 or less;

a polyester resin (B); and a cross-linking agent (C), wherein the cross-linked rubber contains 7 to 40 wt % of the carboxyl group-containing highly saturated nitrile rubber (A1), 10 to 78 wt % of the highly saturated nitrile rubber (A2), and 15 to 50 wt % of the polyester resin (B) when a total of the carboxyl group-containing highly saturated nitrile rubber (A1), the highly saturated nitrile rubber (A2), and the polyester resin (B) is made 100 wt %, and the cross-linked rubber has 100% tensile stress of 10 MPa or more.

6. The cross-linked rubber according to claim 5 wherein the polyester resin (B) is polyethylene terephthalate, polybutylene terephthalate, and/or polyethylene naphthalate.

7. A cross-linkable nitrile rubber composition obtained by blending a cross-linking agent (C) into the highly saturated nitrile rubber composition according to claim 2.

8. A cross-linked rubber obtained by cross-linking the cross-linkable nitrile rubber composition according to claim 7.

* * * * *